Patented Sept. 13, 1932

1,876,955

UNITED STATES PATENT OFFICE

GEORG KALISCHER AND HEINRICH RITTER, OF FRANKFORT-ON-THE-MAIN, AND ERNST HONOLD, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR MANUFACTURING AMINO-ALDEHYDE COMPOUNDS

No Drawing. Application filed February 20, 1930, Serial No. 430,126, and in Germany February 25, 1929.

We have found that in aromatic aldehydes of the benzene-, naphthalene- and anthracene series containing replaceable halogen atoms in their molecule, particularly in ortho-position to the aldehyde group, these halogen atoms react in a smooth reaction with acid amides and their mono-aryl derivatives.

The process may be carried out in such a manner that the components are heated together in presence or absence of a diluent such as nitrobenzene or amylalcohol or cyclohexanol with or without addition of a catalyst, such as copper or its salts, in presence of an acid binding agent, such as sodium acetate, alkali carbonates or similar acting agents.

When using, for instance, ortho-chlorobenzaldehyde and toluenesulfamide in this simplest case the reaction runs probably according to the following equation:

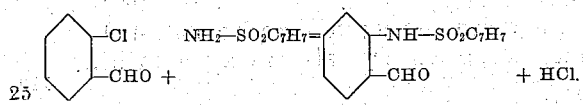

The arylamino compounds thus obtained are new compounds. They correspond probably to the general formula $$\text{aryl}{<}^{(NX-R-phenyl)n}_{CHO}$$

wherein $n$ is the number 1 or 2 and X means hydrogen or an aryl residue, R means $SO_2$ or CO and phenyl stands for a residue of the benzene series, aryl means an aromatic residue of the benzene, naphthalene or anthracene series, which may contain further substituents, inter alia halogen or a further aldehyde group. Especially valuable are the compounds of the general formula

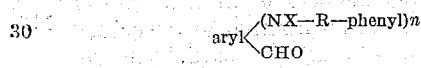

wherein $n$, X and aryl have the aforesaid signification and R means a residue of the benzene series and the groups $NX-SO_2-R$ stand in an adjacent position to the $-CHO$ group. They are solid substances generally of a crystalline structure and soluble in caustic alkali solutions. When treated with a saponifying agent they are transformed into the corresponding aminoaldehydes.

If more than one replaceable halogen atom be present in the molecule of the starting material they can be replaced by the acylamino residue successively. When using halogen-dialdehydes, such as dichloroterephthalaldehyde, likewise the corresponding mono- and diacyl-aminodialdehydes are obtained.

The derivatives of the acid amides which are substituted at the nitrogen atom by a mono-aryl residue show the same reactivity.

The sulfonic acid amides, such as toluenesulfamides, toluenesulfanilide and likewise sulfamide itself are especially suitable for the present process. But likewise carbonic acid amides, such as benzamide, phthalimide and other can be used.

The present process is favored by the presence of further substituents in the molecule of the starting material, whereby the halogen atoms are labilized. For instance nitro groups in ortho- or para-position to the halogen atoms are favorable for a smooth reaction.

The present process, according to which aminoaldehye compounds can be produced in a simple manner which compounds were formerly only obtainable with difficulty, is therefore, of considerable technical importance.

Example 1

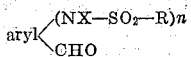

A mixture of 25 parts of 5-nitro-2-chlorobenzaldehyde, 25 parts of para-toluenesulfamide, 20 parts of potassium carbonate, 0,2 parts of copper powder and 0,3 parts of cuprous chloride is heated for about 3 hours at 170–190° while stirring. Then the yellowish reaction mass is diluted with water, boiled off and filtrated. The yellowish filtrate containing the potassium salt of the toluenesulfamino compound is acidulated by means of dilute hydrochloric acid. Then the new 5-nitro-2-para-toluenesulfamino-benzaldehyde of the formula:

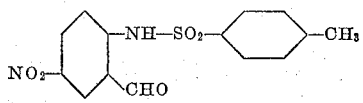

separates as a yellow precipitate. It is filtered off and dried. Recrystallized from glacial acetic acid it represents colorless prisms melting at about 181–182°, soluble in a cold caustic soda solution and a hot solution of sodium carbonate with a yellowish color. The phenylhydrazone crystallizes from glacial acetic acid as yellow needles and melts at about 214° with decomposition.

When carrying out the reaction with addition of about 100 to 150 parts of nitrobenzene the reaction mass remains thinly liquid. When the reaction is finished the nitrobenzene is removed by steam distillation.

Instead of acting with para-toluenesulfamide one may use carboxylic acid amides, such as benzamide or phthalimide thus forming in the same manner the 5-nitro-2-benzamino or phthalimino-benzaldehyde.

These acylamino compounds are saponified in the usual manner. The toluenesulfamino compound, for instance, may be heated for about half an hour to 60–80° after addition of the sixfold to eightfold quantity of sulfuric acid of 90–95% strength. The 5-nitro-2-aminobenzaldehyde thus formed shows the properties as described in literature (see Chem. Centralbl. 1903, I, 921).

*Example 2*

A mixture of 15 parts of ortho-chlorobenzaldehyde, 30 parts of para-toluenesulfamide, 15 parts of potassium carbonate, 0,2 parts of copper powder and 0,3 parts of cuprous chloride is heated for about 6 hours at 160–180° while stirring. The yellow reaction mass is diluted with hot water, boiled off and filtrated. By acidulating the yellowish filtrate the new 2-para-toluenesulfamino-benzaldehyde of the formula:

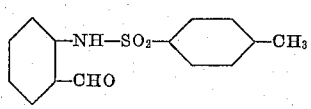

precipitates. It is filtered off and dried. It crystallizes from alcohol as colorless crystals melting at about 203–205°.

When heating this compound, for instance, for half an hour with about the sixfold quantity of sulfuric acid of 90% strength at 60–70° the acid residue is split off and the 2-aminobenzaldehyde is obtained.

In an analogous manner the para-chlorobenzaldehyde yields the 4-aminobenzaldehyde, its 3-nitro derivative the 4-amino-3-nitrobenzaldehyde, the 2.5-dichloro- and the 2.4.5-trichloro-benzaldehyde the corresponding arylsulfamino-compounds and by saponification thereof the free aminoaldehydes.

When heating ortho-chlorobenzaldehyde for some hours with para-toluenesulfo-para-toluidide in presence of, for instance, sodium acetate a new compound of the formula:

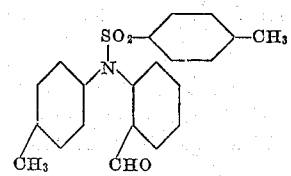

is obtained.

By heating it with concentrated sulfuric acid the acid residue is split off and simultaneously ring closure occurs, whereby the 6-methylacridine is formed.

*Example 3*

A mixture of 75 parts of 2.6-dichchlorobenzaldehyde, 25 parts of para-toluenesulfamide, 22 parts of potassium carbonate, 0,2 parts of copper powder and 0.2 parts of cuprous chloride is heated for about 3 hours at 160–180°.

Then the reaction mass is diluted with water and the exceeding dichlorobenzaldehyde is expelled by steam-distillation. The remaining yellow solution is filtrated and acidulated, whereby the new 2-toluenesulfamino-6-chlorobenzaldehyde of the formula:

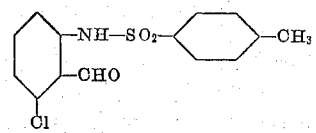

separates as a yellow precipitate. It is filtered off and dried. It crystallizes from alcohol as almost colorless crystals having a melting point of 150°, soluble in a cold dilute alkali solution and in a hot carbonate solution with a yellow color.

The phenylhydrazone crystallizes from alcohol as yellow prisms of 166° melting point.

By saponification in a manner as described above the 6-chloro-2-aminobenzaldehyde results.

When using an excess of para-toluenesulfamide and the corresponding quantity of potassium carbonate it is possible to replace both halogen atoms by the acid amido residue.

*Example 4*

20 parts of 3-nitro-2.6-dichlorobenzaldehyde are mixed with 40 parts of toluenesulfamide, 30 parts of potassium carbonate, 0,2 parts of copper powder, 0,3 parts of cuprous chloride and about 200 parts of nitrobenzene and the mixture is heated to boiling for about 4 hours while stirring. The reaction mass is worked up as described in Example 3. The condensation product has been proved as free from halogen. On account of the anaylsis we ascribe to it the probable formula:

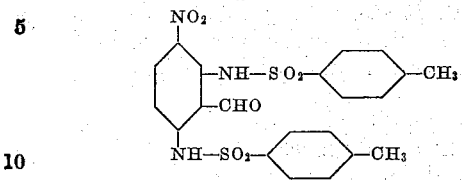

The new 3-nitro-2.6-di-para-toluenesulfamino-benzaldehyde thus formed crystallizes from glacial acetic acid as colorless leaflets having a melting point of about 162°, its phenylhydrazone crystallizes from alcohol as yellow needles having a melting point of about 228°.

By saponifying the new aldehyde compound, for instance, by treating it at about 70° with the eightfold quantity of sulfuric acid of 90% strength the new 3-nitro-2.6-diaminobenzaldehyde is obtained representing in a pure state yellow needles having a melting point of about 250–251°.

When using vice versa an excess of 3-nitro-2.6-dichlorobenzaldehyde it is possible to replace only one of the halogen atoms by the toluenesulfamino residue.

*Example 5*

A mixture of 10 parts of 2.5-dichloro-terephthalaldehyde, 25 parts of para-toluenesulfamide, 18 parts of potassium carbonate, 0,2 parts of copper, 0,2 parts of cuprous chloride and about 60 parts of nitrobenzene is heated for about 3 hours to boiling while stirring. In the same manner as described in the foregoing examples the new di-toluenesulfamino compound of the formula:

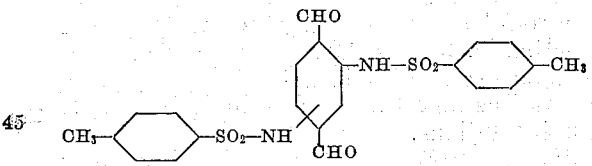

and by saponifying this latter compound the new 2.5-diamino-terephthalaldehyde of the formula

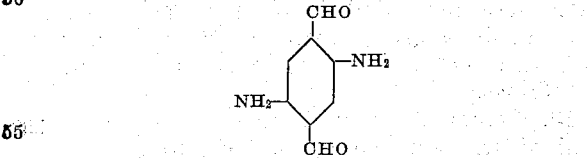

is obtained, which crystallizes from for instance tri-chlorobenzene as yellow needles, melting above 300°.

*Example 6*

20 parts of 10-chloro-anthracene-9-aldehyde obtainable, for instance, according to Example 2 of U. S. Patent 1,717,567 are mixed with 20 parts of para-toluenesulfamide or the corresponding amount of benzenesulfamide, 20 parts of potassium carbonate, 0,2 parts of copper and 0,2 parts of cuprous chloride and about 75 parts of nitrobenzene and the mixture is heated at 180–200° for about 4 hours. The nitrobenzene is expelled by steam distillation and the arylsulfamino-compound is isolated as described above. The new 10-para-toluenesulfamino-anthracene-9-aldehyde corresponding probably to the formula:

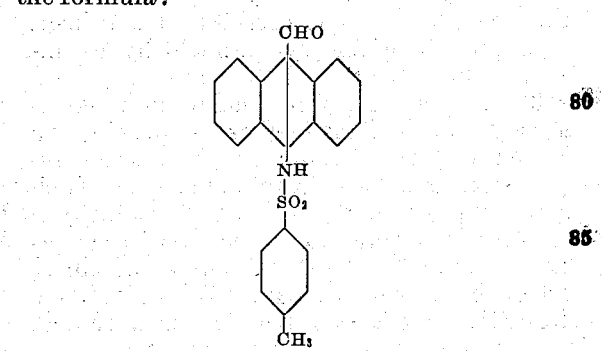

thus obtained crystallizes from glacial acetic acid as weakly yellow needles melting at about 270° with decomposition.

*Example 7*

27 parts of 1-chloroanthraquinone-2-aldehyde are mixed with 20 parts of para-toluenesulfamide, 20 parts of anhydrous potassium acetate, 0,5 parts of copper acetate and about 300 parts of amylalcohol and the mixture is heated for some hours in an apparatus provided with a reflux condenser. When cold the alcohol is expelled by steam distillation and the reaction product is purified by dissolving it in water with addition of some caustic soda solution. From the brown solution a weakly yellowish substance is isolated by acidulation, soluble in concentrated sulfuric acid with a yellowish brown color. After addition of water to this solution the 1-amino-anthraquinone-2-aldehyde is obtained.

It appears from the examples that the replaceable halogen atoms stand in ortho- or, when the aldehyde group occupies the 9-position of the anthracene nucleus, in the 10-position thereof, united by a direct bond with the 9-position, all these positions being defined in the following claims as adjacent for brevity's sake.

We claim:

1. The process for producing amino-arylaldehydes which comprises condensing an aromatic aldehyde containing at least one replaceable halogen atom in its molecule which stands in adjacent position to the aldehyde group with an amido compound of the general formula NHX—R—phenyl, wherein X means hydrogen or an aryl radical, R. stands for $SO_2$ or CO and phenyl for a radical of the benzene series and saponifying the acylaminoaldehyde compound thus formed.

2. The process for producing amino-arylaldehydes which comprises condensing an aromatic aldehyde containing at least one replaceable halogen atom in its molecule which stands in adjacent position to the aldehyde group with an amido compound of the general formula NHX—R—phenyl, wherein X means hydrogen, or an aryl radical, R stands for $SO_2$ or CO and phenyl for a radical of the benzene series in presence of a diluent and saponifying the acylaminoaldehyde compound thus formed.

3. The process for producing amino-arylaldehydes which comprises condensing an aromatic aldehyde containing at least one replaceable halogen atom in its molecule which stands in adjacent position to the aldehyde group with an amido compound of the general formula NHX—R—phenyl, wherein X means hydrogen, or an aryl radical, R stands for $SO_2$ or CO and phenyl for a radical of the benzene series in presence of a diluent and with addition of a catalyst, and saponifying the acylaminoaldehyde compound thus formed.

4. The process for producing amino-arylaldehydes which comprises condensing an aromatic aldehyde containing at least one replaceable halogen atom in its molecule which stands in adjacent position to the aldehyde group with an arylsulfamido compound and saponifying the acylaminoaldehyde compound thus formed.

5. The process for producing amino-arylaldehydes which comprises condensing an aromatic aldehyde containing at least one replaceable halogen atom in its molecule which stands in adjacent position to the aldehyde group with an arylsulfamido compound in presence of a diluent and saponifying the acylaminoaldehyde compound thus formed.

6. The process for producing amino-arylaldehydes which comprises condensing an aromatic aldehyde, containing at least one replaceable halogen atom in its molecule which stands in adjacent position to the aldehyde group with an arylsulfamido compound in presence of a diluent and with addition of a catalyst, and saponifying the acylaminoaldehyde compound thus formed.

7. The process for producing amino-arylaldehydes which comprises condensing an aromatic aldehyde containing at least one replaceable halogen atom in its molecule which stands in adjacent position to the aldehyde group with an arylsulfamide in presence of a diluent and with addition of a catalyst, and saponifying the acylaminoaldehyde compound thus formed.

8. The process for producing new acylamino-aldehyde compounds which comprises condensing an aromatic aldehyde containing at least one replaceable halogen atom in its molecule which stands in adjacent position to the aldehyde group with an amido compound of the general formula NHX—R—phenyl, wherein X means hydrogen, or an aryl radical, R stands for $SO_2$ or CO and phenyl for a radical of the benzene series in presence of diluent and with addition of a catalyst.

9. As new compounds aromatic acylaminoaldehyde compounds corresponding probably to the general formula:

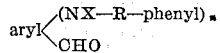

wherein $n$ stands for the number 1 or 2, X means hydrogen or an aryl group, R stands for $SO_2$ or CO and phenyl for a radical of the benzene series, aryl means an aromatic radical of the benzene, naphthalene or anthracene series and the groups NX—R—phenyl stand in an adjacent position to the —CHO group.

10. The process for producing new acylamino-aldehyde compounds which comprises condensing an aromatic aldehyde containing at least one replaceable halogen atom in its molecule which stands in adjacent position to the aldehyde group with an aryl sulfamido compound in presence of a diluent and with addition of a catalyst.

11. As new compounds aromatic arylsulfaminoaldehyde compounds corresponding probably to the general formula:

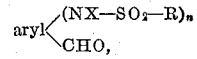

wherein $n$ is the number 1 or 2, X means hydrogen or an aryl group, R means a radical of the benzene series and aryl means an aromatic radical of the benzene-, naphthalene- or anthracene series the group —NH—SO$_2$—R standing in an adjacent position to the —CHO group, which compounds are solid substances generally of a crystalline structure acid, soluble in caustic alkali solutions.

12. The process for producing new acylamino-compounds which comprises condensing an aromatic aldehyde containing at least one replaceable halogen atom in its molecule which stands in adjacent position to the aldehyde group with an arylsulfamide in presence of a diluent and with addition of a catalyst.

13. As new compounds aromatic arylsulfaminaldehyde compounds corresponding probably to the general formula:

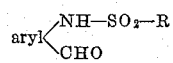

wherein R means a radical of the benzene series, aryl means an aromatic radical of the benzene-, naphthalene- or anthracene series the group —NH—SO$_2$—R standing in an adjacent position to the CHO group, which compounds are solid substances generally of a crystalline structure and soluble in caustic alkali solutions.

14. As new compounds aromatic sulfaminaldehyde compounds corresponding probably to the general formula:

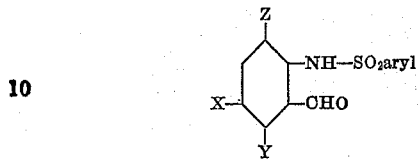

wherein X and Z means hydrogen or a nitro-group, Y means hydrogen, chlorine or the group NH—SO$_2$— aryl, which products are solid substances generally of a crystalline structure and soluble in caustic alkali solutions.

In testimony whereof, we affix our signatures.

GEORG KALISCHER.
HEINRICH RITTER.
ERNST HONOLD.